US009747040B1

(12) United States Patent
Balakrishnan et al.

(10) Patent No.: US 9,747,040 B1
(45) Date of Patent: Aug. 29, 2017

(54) METHOD AND SYSTEM FOR MACHINE LEARNING FOR WRITE COMMAND SELECTION BASED ON TECHNOLOGY FEEDBACK

(71) Applicant: EMC Corporation, Hopkinton, MA (US)

(72) Inventors: Ajith Balakrishnan, Bangalore (IN); Bradley A. Bowlin, Fort Collins, CO (US); Rong Yu, West Roxbury, MA (US); Arieh Don, Newton, MA (US); Peng Wu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 254 days.

(21) Appl. No.: 14/755,652

(22) Filed: Jun. 30, 2015

(51) Int. Cl.
*G06F 12/00* (2006.01)
*G06F 3/06* (2006.01)

(52) U.S. Cl.
CPC ............ *G06F 3/0611* (2013.01); *G06F 3/067* (2013.01); *G06F 3/0659* (2013.01); *G06F 3/0689* (2013.01)

(58) Field of Classification Search
None
See application file for complete search history.

(56) References Cited

U.S. PATENT DOCUMENTS

| 6,434,637 | B1 | 8/2002 | D'Errico | |
|---|---|---|---|---|
| 2011/0078367 | A1* | 3/2011 | Minkin | G06F 12/084 711/104 |
| 2012/0011191 | A2* | 1/2012 | Kaspar | H04W 76/025 709/203 |
| 2012/0117320 | A1* | 5/2012 | Pinchover | G06F 3/0611 711/112 |
| 2014/0282918 | A1* | 9/2014 | Rothschild | H04L 63/0815 726/4 |
| 2017/0003912 | A1* | 1/2017 | Li | G06F 3/061 |

* cited by examiner

*Primary Examiner* — John A Lane
(74) *Attorney, Agent, or Firm* — Krishnendu Gupta

(57) ABSTRACT

Example embodiments of the present invention relate to methods, systems, and computer program products for reducing I/O latency in a storage system. The method include polling a storage system for values related to caching of I/Os in global memory for subsequent destaging to disk. The host then may determine respective write delay values for I/Os to be sent from a host communicatively coupled with the storage system according to the values related to caching of I/Os. The write delay values then may be applied to the I/Os at the host to delay sending of the I/Os by respective delay times from the host to the storage system.

21 Claims, 7 Drawing Sheets

METHOD AND SYSTEM FOR MACHINE LEARNING FOR WRITE COMMAND SELECTION BASED ON TECHNOLOGY FEEDBACK

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Enterprise storage systems store data in large-scale environments and differ from consumer storage systems in both the size of the environment and the types of technologies that store and manage the data. Storage area networks (SANs) are commonly used in enterprise storage systems to transfer data between computer systems and storage devices. A typical SAN provides a communication infrastructure, including physical connections between computer systems, storage devices, and a management layer that organizes the connections between computer systems and storage devices.

In a SAN environment, computer systems, typically referred to as hosts, connect to the SAN via one or more host bus adapters. In the case of a Fibre Channel SAN, the physical connections between hosts and storage devices may include special Fibre Channel host bus adapters, Fibre Channel switches, Fibre Channel routers, and optical fiber.

Storage devices may include multiple disk drives that combine to form a disk array. A typical disk array includes a disk array controller, a cache, disk enclosures, and a power supply. Examples of disk arrays include the Symemtrix® Integrated Cache Disk Array System the CLARiiON® Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into redundant array of inexpensive disks (RAID) groups for redundancy and efficient performance. RAID is a system that uses multiple disk drives that share or replicate data among the drives. Accordingly, a RAID system can present multiple physical hard drives to a host as a single logical disk drive.

Disk array controllers connect to a SAN via a port. A port serves as an interface between the disk array controller and other devices, such as the hosts, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host bus adapter port) and a "target" (e.g., a storage controller port) via a path (i.e., a storage path). For example, a path may include a host bus adapter port, associated SCSI bus or Fibre Channel cabling, a disk array port, and a LUN. The types of path components in use vary with the storage I/O transport technology in use.

Management of storage paths is provided by path management software. Path management software is a host-based software solution that is used to manage paths and, among other things, can detect load imbalances across paths and buses and can identify alternate paths through which to route data. An example of path management software is PowerPath® by EMC Corporation of Hopkinton, Mass.

Although prior path management software systems may monitor load balances and identify alternate paths through which to route data, a network or storage administrator must evaluate network path faults. Current approaches for detecting setup and path problems in a SAN require analysis of difficult to read output from various user interfaces, including Command Line Interfaces (CLIs). Although custom programming and scripts are available to monitor system logs and device states, the number of path faults that an administrator must identify and remedy increases dramatically as the amount of data and number of physical connections between initiators and targets increase. This may cause a delay in the administrator restoring a path, and lead to increased costs due to having administrators responsible for managing path management. Further, detecting setup and path problems in prior path management systems require the use of custom programming/scripts to monitor system logs and device states or a host-based CLI typically accessed via remote shell and analysis of complex and unwieldy text output from CLIs.

SUMMARY

Example embodiments of the present invention relate to methods, systems, and computer program products for reducing I/O latency in a storage system. The method include polling a storage system for values related to caching of I/Os in global memory for subsequent destaging to disk. The host then may determine respective write delay values for I/Os to be sent from a host communicatively coupled with the storage system according to the values related to caching of I/Os. The write delay values then may be applied to the I/Os at the host to delay sending of the I/Os by respective delay times from the host to the storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
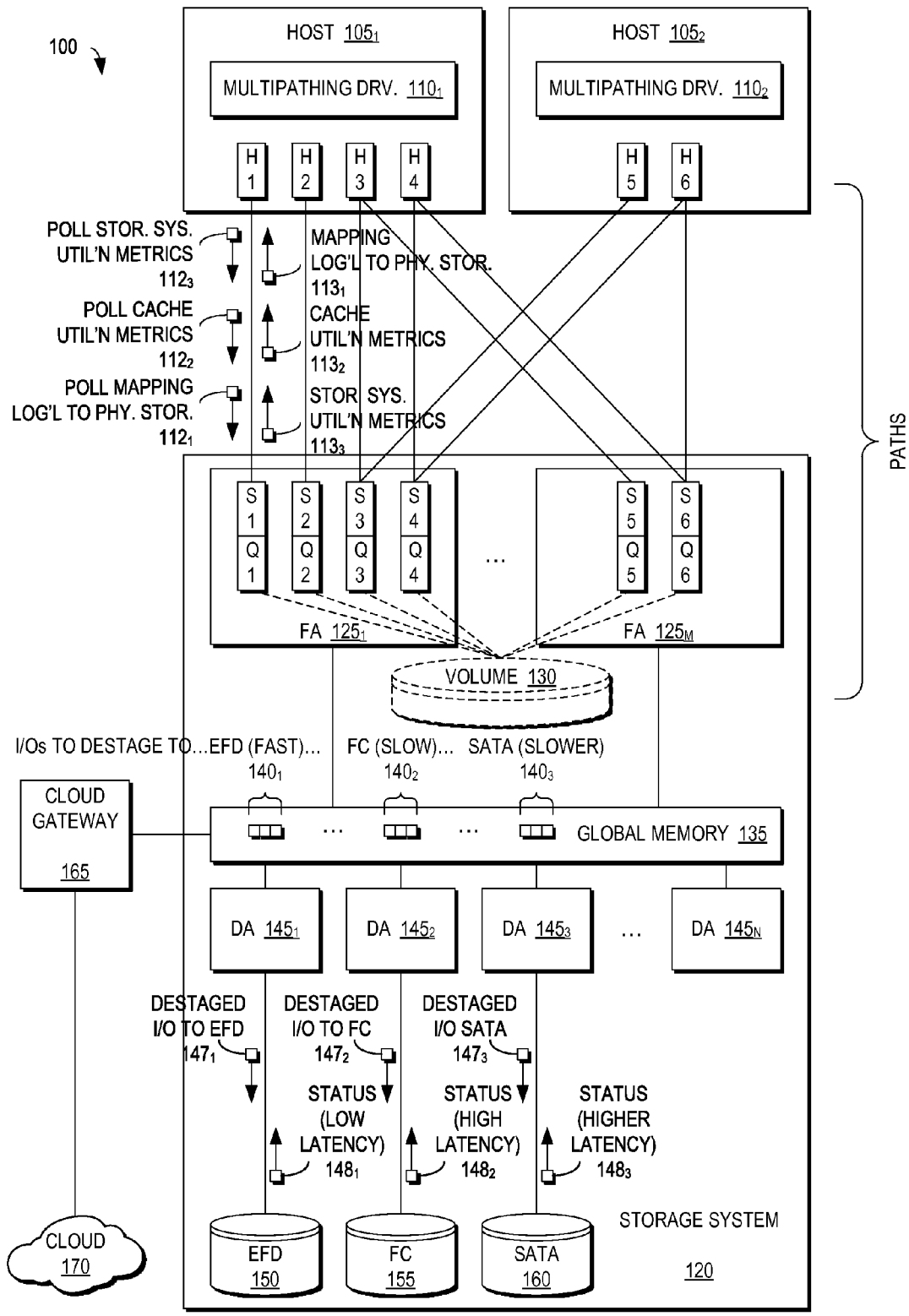
FIG. 1 is a block diagram of a multipathing environment, including a logical volume having a plurality of underlying physical storage technologies, according to an example embodiment of the present invention.

FIG. 1 is a block diagram of a multipathing environment (i.e., data center) 100 according to an example embodiment of the present invention. As illustrated in FIG. 1, a storage system 120 may provide a storage volume 130 for I/O operations with a plurality of hosts $105_1$, $105_2$ (105 generally). The hosts 105 may be communicatively coupled with the volume 130 via a plurality of paths from respective host ports H1-H6 through the plurality of storage ports S1-S6 with port selection at each host 105 managed by a multipathing driver $110_1$, $110_2$ (110 generally). Such multipath storage environments 100 typically are deployed with redundancies for enterprise purposes. As illustrated in FIG. 1, the first host $105_1$ has six paths to the volume 130 (i.e., H1/S1, H2/S2, H3/S3, H4/S4, H3/S5, and H5/S6) and the second host $105_2$ has three paths to the volume 130 (i.e., H5/S3, H6/S4, and H6/S6). These redundancies in data centers 100 provide value by preventing data unavailability (DU).

The data storage system 120 may also include different types of adapters (or directors) such as a front-end adapter (FA) $125_1$-$125_M$ (165 generally), a remote adapter (RA) (e.g., RA 431 of FIG. 4), and/or a device interface disk adapter (DA) $145_1$, $145_2$, $145_3$ (145 generally). In an embodiment, the FAs may be used to manage communications and data operations between one or more host systems. In an embodiment, the RA may be used, for example, to facilitate communications between data storage systems. In an embodiment, the DAs 145 may interface with Enterprise Flash Drives (EFD) 150, Fibre Channel (FC) drives 155, Serial ATA (SATA) hard drives 160, and the like. Each of the adapters may be implemented using hardware including one or more processors with local memory with code stored thereon for execution in connection with performing different operations.

In an embodiment, the FA 125 may be a Fibre Channel (FC) Adapter or other adapter which facilitates host 105 communication and may be characterized as a front-end component of the data storage system 120 which receives a request from the host 105. The DAs 145 may also be characterized as back-end components of the data storage system 120 which interface with the physical data storage devices 150, 155, 160. One or more internal logical communication paths may exist between the DAs, the RAs, the FAs, and internal memory (not shown). An embodiment, for example, may use one or more internal busses and/or communication modules. For example, there may be global memory (i.e., cache) 135 that may be used to facilitate data transfers and other communications between the DAs 145, FAs 125, and/or RAs in a data storage system 120. In one embodiment, the DAs may perform data operations using a cache that may be included in the global memory, for example, when communicating with other DAs 145 and other components of the data storage system 120.

Traditional adaptive load balancing algorithms employed by multipathing I/O (MPIO) driver 110 policies include static, round robin, weighted, and path response time. These policies consider only factors that can be measured from a host, such as information regarding I/Os sent to a storage array (e.g., number, size, read or write), observed queuing delay, latency on each path, and throughput of recent I/Os, and do not use actual array port performance attributes. Further, as described in U.S. patent application Ser. No. 14/502,327 entitled "METHOD AND APPARATUS FOR COST-BASED LOAD BALANCING FOR PORT SELECTION" and incorporated herein by reference in its entirety, multipathing divers 110 may perform load balancing according to performance data regarding a storage port S, rather than assuming a load on the storage port S, and to take into consideration variable processing power of the storage ports and their respective loads.

In general, when a write I/O from a host 105 arrives at the data storage system 120, it is stored in the global memory 135 for later destaging to storage media, such as EFD 150, FC 155, SATA 160, and even via a Cloud Gateway 165 to the Cloud 170. In certain embodiments, the data storage system 120 use Federated Tiered Storage (FTS) to transfer the write request to a cloud gateway 165 which may perform a protocol conversion from, for example, FC to a cloud protocol (e.g., Amazon Web Services, Microsoft Azure, VMware vCloud Air, etc.) and then to Ethernet.

When the global memory 135 fills, processing of new writes from the hosts 105 is delayed until a sufficient number of global memory 135 slots are freed to store incoming write I/Os (i.e., until a sufficient amount of data is destaged from the global memory 135 to storage media). In traditional MPIO load balancing algorithms, this "wait for cache" delay happens for all writes regardless of the ultimate storage technology on which the I/O is written (i.e., EFD 150, FC 155, SATA 160, or Cloud 170) or the storage system 120 load (e.g., the volume of I/Os being processed) because the host 105 is sending I/Os regardless of storage technology without any control over which I/Os to which storage technology are first sent to the storage system 120.

While these policies work when a storage device (e.g., volume 130) is located on one type of storage technology (i.e., one of EFD 150, FC 155, SATA 160, and Cloud 170), such policies are inefficient for load balancing across storage having a plurality of storage technologies. For example, Fully Automated Storage Tiering (FAST) by EMC Corporation of Hopkinton, Mass. enables portions of a storage device (e.g., volume 130) to be stored in various storage technologies, such as EDF, FC, SATA, and even to the cloud. Accordingly, with portions of a storage device 130 potentially residing on different storage technologies, a response time-based MPIO path selection process is sub-optimal (i.e., the measured response times will be inconsistent depending on the inherent write latency values of the underlying storage technologies. Further, the storage system 120 may allow for dynamic, on the fly, memory and processing core allocation which means that storage system 120 performance characterization may change on the fly and under I/O load per user needs.

Accordingly example embodiments of the present invention overcome these and other deficiencies in the prior art by providing a method, a system, and a computer program product for controlling dispatching write I/Os to a storage system 120 based on a dynamic feedback loop to determine write delay values for I/Os (i.e., rather than a constant write delay value) per physical storage device technology. For example, at times the storage system 120 is performing a RAID rebuild for many RAID groups (e.g., after drive replacement), the DA 145 cores are under heavy load and, therefore, a static policy of, for example, preferring write I/Os to EFDs to shorten write-wait-times for write I/Os going to EFDs will not be effective with the EFD DA 145$_1$ being busy with another task. Rather, in example embodiments of the present invention, for the multipathing driver 110 may continuously measure/poll the storage system for I/O performance and use adaptive heuristics to determine proper I/O write delay values.

In an example embodiment of the present invention, the storage system 120 collects storage system utilization statistics such as statistics regarding global memory 135 utilization per storage device (i.e., how many cache slots are being used per storage device 150, 155, 160, 170) so it can be determined whether cache slots can be used by other devices, overall storage system 120 load (i.e., if the storage system 120 is processing I/Os at its capacity cache performance increase is not possible), and drive technology per storage volume 130 slice (i.e., a mapping of each storage volume 130 slice to its underlying physical storage technology (e.g., EFD 150, FC 155, SATA 160, Cloud 170)). Accordingly, the storage system 120 may track the drive technology (e.g., EFD 150, FC 155, SATA 160, Cloud 170) per each FAST storage device slice (e.g., 5.376 MB) in a mapping.

Figure 2:
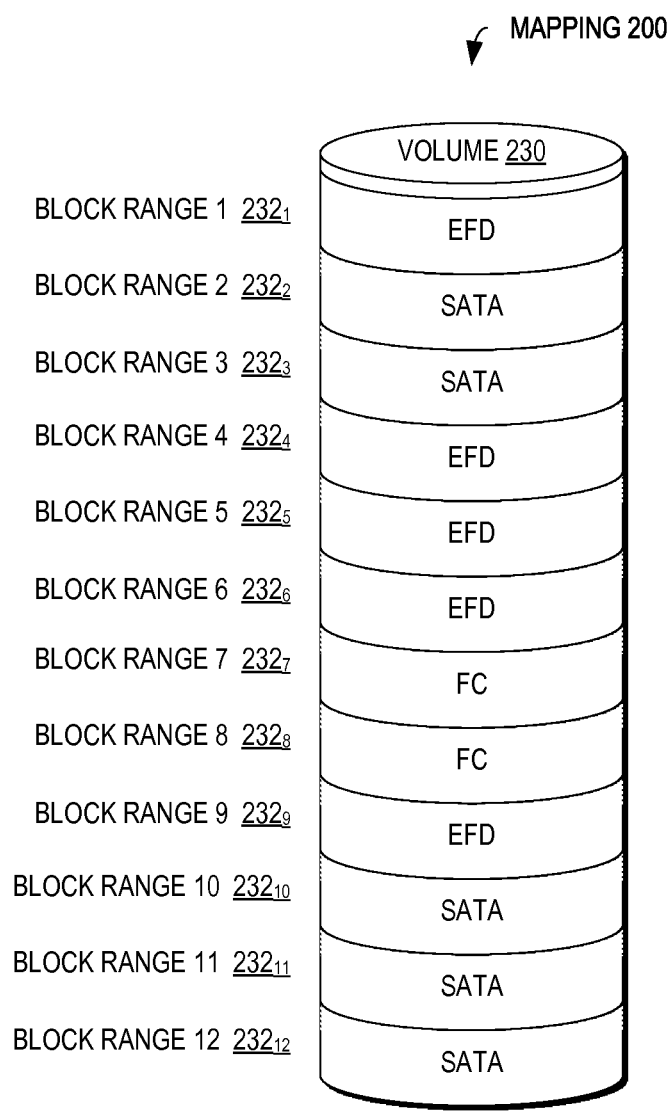
FIG. 2 is a block diagram of a mapping of logical volume block ranges and underlying physical storage technologies according to an example embodiment of the present invention.

FIG. 2 is a block diagram of a mapping 200 of logical volume 230 block ranges 232$_1$-232$_{12}$ (232 generally) and underlying physical storage technologies (e.g., EFD 150, FC 155, SATA 160) according to an example embodiment of the present invention. As illustrated in FIG. 2, block ranges 1 232$_1$, 4 232$_4$, 5 232$_5$, 6 232$_6$ and 9 232$_9$ of the volume 230 are stored on EFD technology, block ranges 7 232$_7$ and 8 232$_8$ are stored on FC technology, and block ranges 2 232$_2$, 3 232$_3$, 10 232$_{10}$, 11 232$_{11}$, and 12 232$_{12}$ of the volume 230 are stored on SATA technology.

Figure 3:
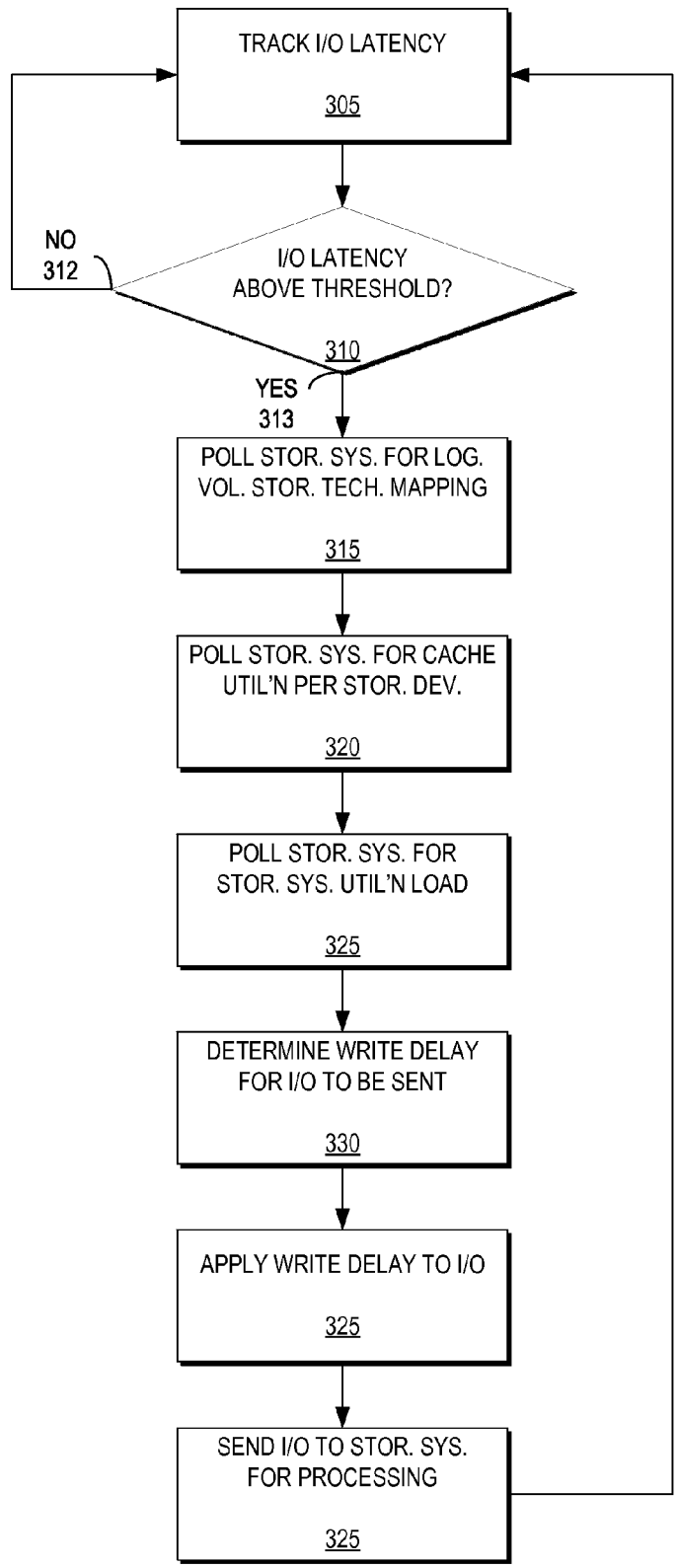
FIG. 3 is a flow diagram illustrating a method according to an example embodiment of the present invention.

FIG. 3 is a flow diagram illustrating a method according to an example embodiment of the present invention. As illustrated in FIG. 3, the multipathing driver 110 tracks storage volume 130 I/O latency (305). For example, the multipathing driver 110 may determine the response times for write I/Os to the storage system 120 which will include the write latency of destaging I/Os to respective physical storage technologies. For example, for destaged data cached in global memory 135 and intended for EFD 150, the DA 145$_1$ is able to destage the I/Os 147$_1$ quickly to EFD 150 which returns a status 148$_1$ quickly because of the EFD's 150 low latency. Similarly, for destaged data cached in global memory 135 and intended for FC 155, the DA 145$_2$ is able to destage the I/Os 147$_2$ slowly to FC 155 which returns a status 148$_2$ slowly because of the FC's 155 high latency. Likewise, for destaged data cached in global memory 135 and intended for SATA 160, the DA 145$_3$ is able to destage the I/Os 147$_3$ more slowly to SATA 160 which returns a status 148$_3$ more slowly because of the SATA's 160 higher latency.

The multipathing driver 110 may determine response times for write I/Os to the storage system 120 (310). If the multipathing driver 110 is receiving favorable response times (e.g., below 2 ms) (i.e., below a threshold) (312) there is no need to adjust how write I/Os are dispatched from the host 105 to the storage system 120 and the host may continue to track I/O latency (305). However, if write I/O latency is above a threshold (e.g., user defined) (313), the multipathing driver 110 may adjust write I/O delays per underlying physical storage technology.

Accordingly, the multipathing driver 110 may poll the storage system 120 for the mapping 200 of logical volume slices (i.e., block ranges 232) to underlying physical storage device technology (as illustrated in FIG. 2) (315). Further, the multipathing driver 110 may poll the storage system 120 for statistics regarding cache utilization per storage device (i.e., how many cache slots are being used) (320) (e.g., as collected by the storage system 120). The multipathing driver 110 also may poll the storage system 120 for the statistics regarding overall storage system 120 utilization load (325). It should be understood that these polls may be performed periodically every T minutes; however, it should be understood that the polling for the mapping 200 need not occur frequently as, typically, retiering of data (i.e., changing the drive technology for slices) occurs, for example, weekly or biweekly.

The multipathing driver 110 then may determine a write delay value for I/Os according to the storage technology (e.g., EFD, FC, SATA, cloud) to which they are to be stored (330). For example, a write delay value for EFD may be on the order of 1 ms, a write delay value for SATA may be on the order of 10 ms (i.e., in that time, send 10 EFD write I/Os), and a write delay value for cloud may be on the order of 100 ms. In a preferred embodiment, the write delay values may be calculated according to actual responsiveness of the storage system. It should be understood that the write delay for a storage technology may be a dynamic value determined according to whether the physical storage device is under heavy load, whether the storage system 120 itself is under heavy load, and what storage type should receive write I/Os under the load conditions (i.e., if the storage system 120 is under extreme load, write I/Os to SATA storage device slices should be delayed more heavily than write I/Os to EFD device slices as, for example, one write I/O to a SATA storage device slice comes at the expense of ten write I/Os to an EFD storage device slice because the write I/O will be destaged faster). Therefore, example embodiments of the present invention may determine I/O write delay values according to any combination of, at least, storage system backend DA 145 load (i.e., as polled by the multipathing driver 110), overall global memory 135 utilization (i.e., if the cache is full, all write I/Os should be delayed and otherwise, for example, non-EFD write I/Os may be delayed), and underlying physical storage characteristics of the target physical storage device for the write I/O.

The multipathing driver 110 then may apply the respective write delays to the I/Os (325) and send the I/Os to the storage system 120 for processing. As an illustrative example, assume the write destage time to SATA is 10 ms and the write destage time to EFD is 1 ms. The multipathing driver 110 may send, for example, ten writes I/Os destined for EFD 150 for every one write I/O destined for SATA 160. This may result in a fast write I/O destage (i.e., if cores are available) or a slow write I/O destage (i.e., if cores are not available). The multipathing driver 110 may saturate the storage system 120 with writes and monitor the timing of status 148 responses to determine individual 145 performance.

Figure 4:
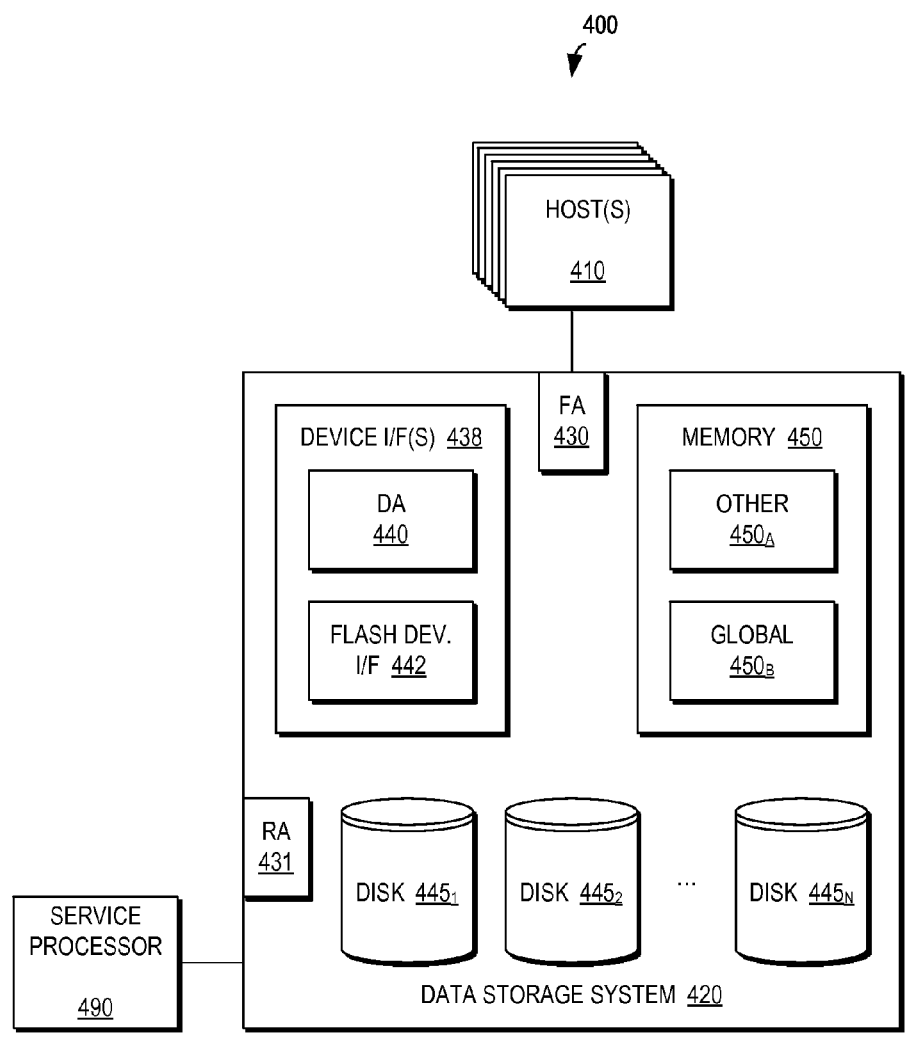
FIG. 4 is a block diagram of the system of FIG. 1 according to an example embodiment of the present invention.

FIG. 4 is a block diagram of the system of FIG. 1 according to an example embodiment of the present invention. As illustrated in FIG. 4, the system 400 includes a data storage system 420 connected to host systems 410 through one or more communication media. In this embodiment of the system 400, the hosts 410 may access the data storage system 420, for example, in performing input/output (I/O)

operations or data requests. The one or more communication media may include any of one or more of a variety of networks or other type of communication connections as known to those skilled in the art. The one or more communication media may include any of: a network connection, bus, and/or other type of data link, such as a hardwire or other connections known in the art. For example, the one or more communication media may include any of: the Internet, an intranet, a network (including a Storage Area Network (SAN)) or other wireless or other hardwired connection(s) by which the host systems 410 may access and communicate with the data storage system 420, and may also communicate with other components included in the system 400.

Each of the host systems 410 and the data storage system 420 included in the system 400 may be connected to the one or more communication media by any one of a variety of connections as may be provided and supported in accordance with the type of one or more communication media 4. The processors included in the host computer systems 410 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 420 are described herein in more detail, and may vary with each particular embodiment. Each of the host systems 410 and data storage system 420 may all be located at the same physical site, or, alternatively, may also be located in different physical locations. The one or more communication media that may be used to provide the different types of connections between the host computer systems and the data storage system of the system 400 may use a variety of different communication protocols such as SCSI, Fibre Channel, iSCSI, and the like. Some or all of the connections by which the hosts and data storage system may be connected to the one or more communication media may pass through other communication devices, such switching equipment that may exist such as a phone line, a repeater, a multiplexer or even a satellite. For example, while not shown in FIG. 4, the system 400 may include a switch connected between host system 410 and data storage system 420 such, for example, a Connectrix® switch made available from EMC Corporation of Hopkinton, Mass.

Each of the host computer systems 410 may perform different types of data operations in accordance with different types of tasks. Any one of the host systems 410 may issue a data request to the data storage system 420 to perform a data operation. For example, an application executing on one of the host systems 410 may perform a read or write operation resulting in one or more data requests to the data storage system 420.

It should be noted that although element 420 is illustrated as a single data storage system, such as a single data storage array, element 420 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. Reference may be made to a single data storage array by a vendor, such as by EMC Corporation of Hopkinton, Mass. However, as will be appreciated by those skilled in the art, the techniques herein are applicable for use with other data storage arrays by other vendors and with components other than those described herein for purposes of example.

Components of the data storage system 420 may communicate using GM 25b. For example, in connection with a write operation, an embodiment may first store the data in cache included in a portion of GM 450B, mark the cache slot including the write operation data as write pending (WP), and then later de-stage the WP data from cache to one of the devices $445_1$-$445_N$ (445 generally). In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate FA in communication with the host.

As described above, the data storage system 420 may be a data storage array including a plurality of data storage devices 445 in which one or more of the devices 445 are flash memory devices employing one or more different flash memory technologies. In one embodiment, the data storage system 420 may be a XtremIO™ or Symmetrix® DMX™ or VMAX® data storage array by EMC Corporation of Hopkinton, Mass. In the foregoing data storage array, the data storage devices 445 may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multilevel cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAID5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

The data storage system 420 may be a data storage array including a plurality of data storage devices 445. The data storage devices 445 may include one or more types of data storage devices such as, for example, one or more disk drives and/or one or more solid state drives (SSDs). An SSD is a physical data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices are flash drives or devices. More generally, the techniques herein may also be used with any type of SSD although the following paragraphs may make reference to a particular type such as a flash device or flash memory device.

The data storage array may also include different types of adapters or directors, such as an FA 430 (host adapter), RA 431 (remote adapter), and/or device interface 438 (e.g., DA 440 (disk adapter) or flash device interface 442). Each of the adapters may be implemented using hardware including a processor with local memory with code stored thereon for execution in connection with performing different operations. The FAs may be used to manage communications and data operations between one or more host systems and the global memory (GM). In an embodiment, the FA may be a Fibre Channel Adapter or other adapter which facilitates host communication. The FA 430 may be characterized as a front-end component of the data storage system which receives a request from the host. The data storage array may include one or more RAs that may be used, for example, to facilitate communications between data storage arrays. The data storage array may also include one or more device interfaces 438 for facilitating data transfers to/from the data storage devices 445. The data storage interfaces 438 may include device interface modules, for example, one or more disk adapters (DAs) (e.g., disk controllers), adapters used to interface with the flash drives, and the like. The DAs may also be characterized as back-end components of the data storage system which interface with the physical data storage devices.

One or more internal logical communication paths may exist between the device interfaces 438, the RAs 431, the FAs 430, and the memory 450. An embodiment, for example, may use one or more internal busses and/or communication modules. For example, the global memory portion $450_B$ may be used to facilitate data transfers and other communications between the device interfaces, FAs and/or RAs in a data storage array. In one embodiment, the device interfaces 438 may perform data operations using a cache that may be included in the global memory $450_B$, for example, when communicating with other device interfaces and other components of the data storage array. The other portion $450_A$ is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the data storage systems, and the data storage systems also may provide data to the host systems through the channels. The host systems do not address the drives or devices of the data storage systems directly, but rather access to data may be provided to one or more host systems from what the host systems view as a plurality of logical devices or logical volumes (LVs). The LVs may or may not correspond to the actual physical devices or drives. For example, one or more LVs may reside on a single physical storage device or multiple physical storage devices. Data in a single data storage system, such as a single data storage array, may be accessed by multiple hosts allowing the hosts to share the data residing therein. The FAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 445. In the following description, data residing on an LV may be accessed by the device interface following a data request in connection with I/O operations that other directors originate. Data may be accessed by LV in which a single device interface manages data requests in connection with the different one or more LVs that may reside on a drive 445. For example, a device interface may be a DA that accomplishes the foregoing by creating job records for the different LVs associated with a particular device. These different job records may be associated with the different LVs in a data structure stored and managed by each device interface.

Also shown in FIG. 4 is a service processor 490 that may be used to manage and monitor the system 420. In one embodiment, the service processor 490 may be used in collecting performance data, for example, regarding the I/O performance in connection with data storage system 420. This performance data may relate to, for example, performance measurements in connection with a data request as may be made from the different host computer systems 410. This performance data may be gathered and stored in a storage area. Additional detail regarding the service processor 490 is described in following paragraphs.

It should be noted that a service processor 490 may exist external to the data storage system 420 and may communicate with the data storage system 420 using any one of a variety of communication connections. In one embodiment, the service processor 490 may communicate with the data storage system 420 through three different connections, a serial port, a parallel port and using a network interface card, for example, with an Ethernet connection. Using the Ethernet connection, for example, a service processor may communicate directly with DAs and FAs within the data storage system 420.

Figure 5:
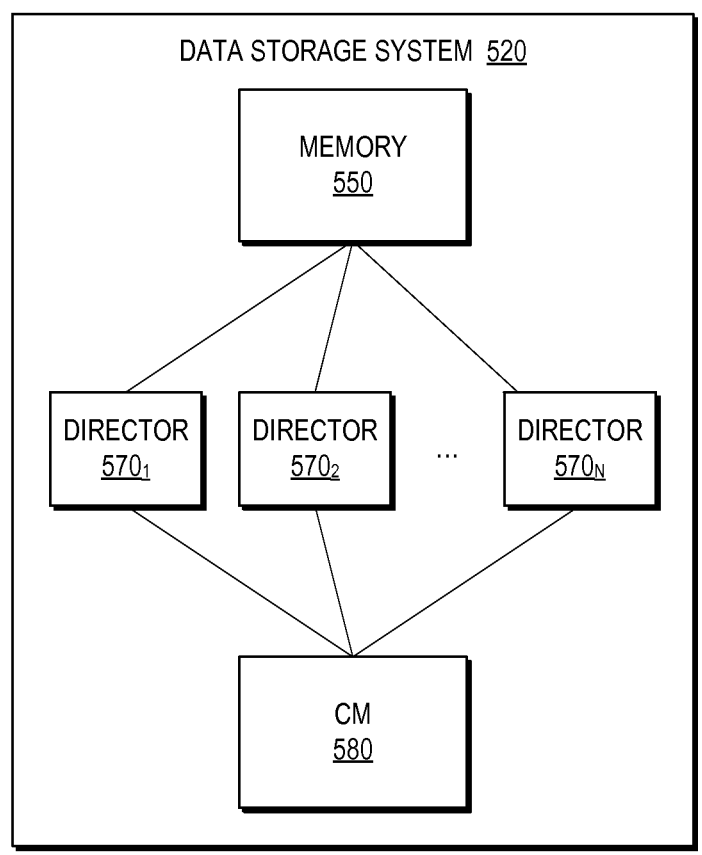
FIG. 5 is a block diagram of logical internal communications between the directors and memory included in an embodiment of a data storage system of FIG. 1A according to an example embodiment of the present invention.

FIG. 5 is a block diagram of logical internal communications between the directors $570_1$-$570_N$ (570 generally) and memory 550 included in an embodiment of a data storage system 520 (similar to the storage system 120 of FIG. 1) according to an example embodiment of the present invention. As illustrated in FIG. 5 the data storage system 520 includes a plurality of directors 570 coupled to the memory 550. Each of the directors 570 represents one of the FAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with each embodiment.

The data storage system 520 also includes an optional communication module (CM) 580 that provides an alternative communication path between the directors 570. Each of the directors 570 may be coupled to the CM 580 so that any one of the directors 570 may send a message and/or data to any other one of the directors 570 without needing to go through the memory 550. The CM 580 may be implemented using conventional MUX/router technology where a sending one of the directors 570 provides an appropriate address to cause a message and/or data to be received by an intended receiving one of the directors 570. In addition, a sending one of the directors 570 may be able to broadcast a message to all of the other directors 570 at the same time.

Figure 6:
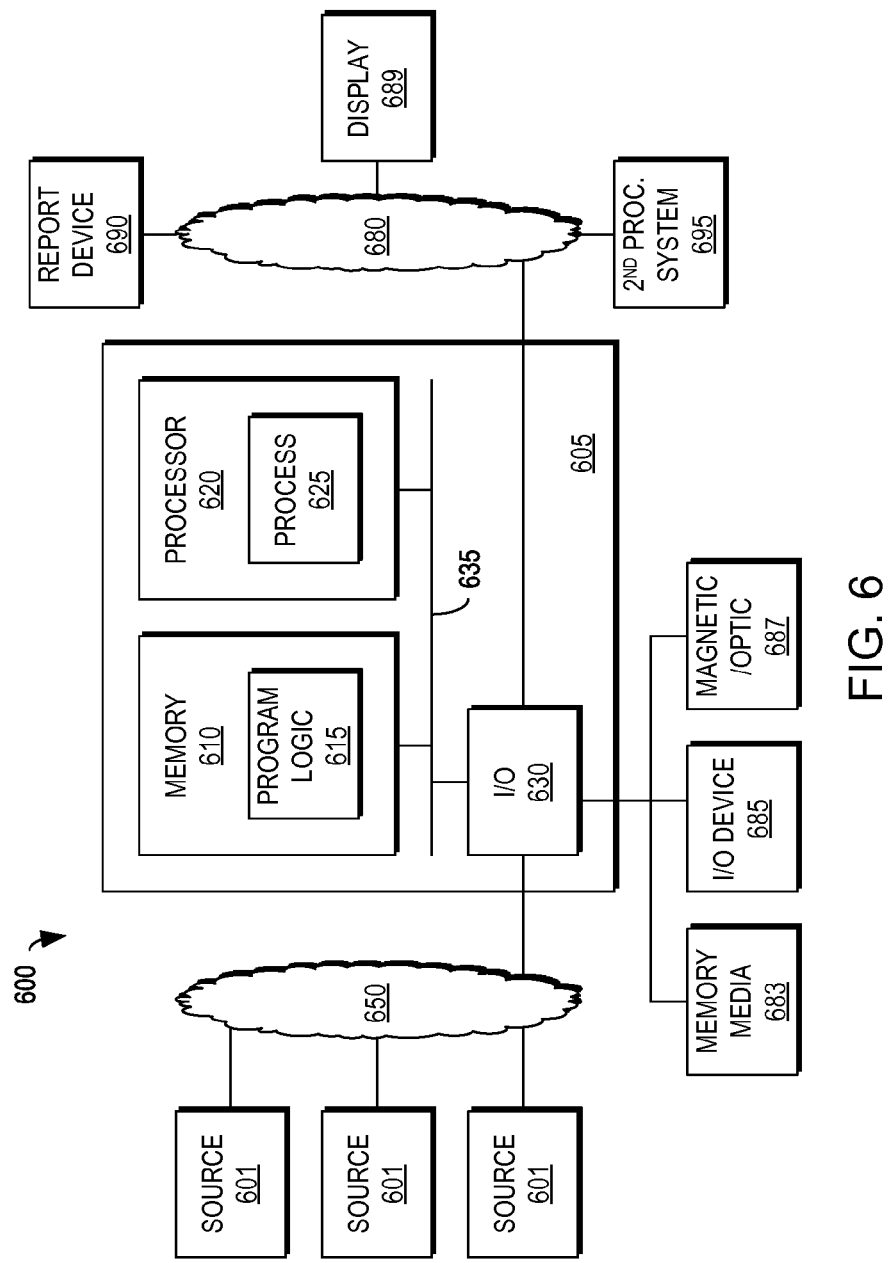
FIG. 6 is a block diagram of an apparatus according to an example embodiment of the present invention.

FIG. 6 is a block diagram of an example embodiment apparatus 605 according to the present invention. The apparatus 605 may be part of a system 600 and includes memory 610 storing program logic 615, a processor 620 for executing a process 625, and a communications I/O interface 630, connected via a bus 635.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 7:
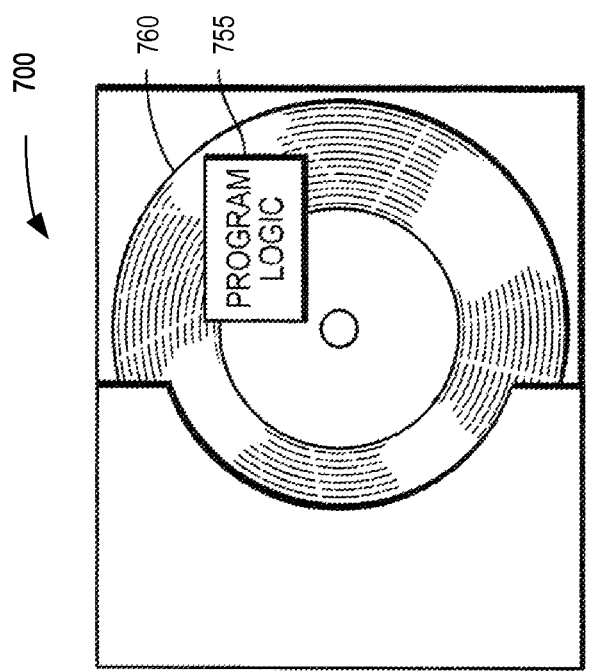
FIG. 7 is a diagram of a computer program product according to an example embodiment of the present invention.

FIG. 7 is a block diagram of a computer program product 700 including program logic 755, encoded on a computer-readable medium 760 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
   polling a storage system for values related to caching of I/Os in global memory for subsequent destaging to disk;
   determining respective write delay values for I/Os to be sent from a host communicatively coupled with the storage system according to the values related to caching of I/Os; and
   applying the write delay values to the I/Os at the host to delay sending of the I/Os by respective delay times from the host to the storage system.

2. The method of claim 1 wherein the logical storage device is a tiered storage device having portions of the logical storage device stored on respective tiers of physical storage having respective storage latencies.

3. The method of claim 2 wherein polling a storage system for values related to caching of I/Os in global memory for subsequent destaging to disk comprises polling the storage system for a mapping of logical storage device blocks to underlying physical storage technology on which the logical storage device blocks are stored.

4. The method of claim 3 wherein determining respective write delay values for I/Os to be sent from a host communicatively coupled with the storage system according to the values related to caching of I/Os comprises determining the write delay values according to a relationship with a storage latency of the underlying physical storage technology to which each I/O is to be written.

5. The method of claim 3 wherein polling a storage system for values related to caching of I/Os in global memory for subsequent destaging to disk further comprises:
   polling the storage system for cache utilization metrics; and
   polling the storage system for storage system utilization metrics.

6. The method of claim 5 wherein determining respective write delay values for I/Os to be sent from a host communicatively coupled with the storage system according to the values related to caching of I/Os further comprises determining the write delay values according to the cache utilization metrics and the storage system utilization metrics.

7. The method of claim 5 wherein polling the storage system for cache utilization metrics comprises determining whether the cache has reached a write pending limit.

8. The method of claim 5 wherein polling a storage system for values related to caching of I/Os in global memory for subsequent destaging to disk further comprises polling the storage system for historical write performance metrics.

9. The method of claim 1 further comprising:
   tracking I/O latency for I/Os from the host to the storage system; and
   if the I/O latency tracked by the host is above a threshold:
      polling the storage system for information regarding storage system cache utilization per logical storage device; and
      polling the storage system for storage system utilization load.

10. The method of claim 9 further comprising:
    sending the I/Os to the storage system for processing; and
    continuing to track I/O latency for the I/Os sent to the storage system for processing.

11. A system comprising:
    a host;
    a storage system; and
    memory storing computer program code that when executed on a processor of the host causes the host to perform the operations of:
       polling a storage system for values related to caching of I/Os in global memory for subsequent destaging to disk;
       determining respective write delay values for I/Os to be sent from a host communicatively coupled with the storage system according to the values related to caching of I/Os; and
       applying the write delay values to the I/Os at the host to delay sending of the I/Os by respective delay times from the host to the storage system.

12. The system of claim 11 wherein the logical storage device is a tiered storage device having portions of the logical storage device stored on respective tiers of physical storage having respective storage latencies.

13. The system of claim 12 wherein polling a storage system for values related to caching of I/Os in global memory for subsequent destaging to disk comprises polling the storage system for a mapping of logical storage device blocks to underlying physical storage technology on which the logical storage device blocks are stored.

14. The system of claim 13 wherein determining respective write delay values for I/Os to be sent from a host communicatively coupled with the storage system according to the values related to caching of I/Os comprises determining the write delay values according to a relationship with a storage latency of the underlying physical storage technology to which each I/O is to be written.

15. The system of claim 13 wherein polling a storage system for values related to caching of I/Os in global memory for subsequent destaging to disk further comprises:
    polling the storage system for cache utilization metrics; and
    polling the storage system for storage system utilization metrics.

16. The system of claim 15 wherein determining respective write delay values for I/Os to be sent from a host communicatively coupled with the storage system according to the values related to caching of I/Os further comprises determining the write delay values according to the cache utilization metrics and the storage system utilization metrics.

17. The system of claim 15 wherein polling the storage system for cache utilization metrics comprises determining whether the cache has reached a write pending limit.

18. The system of claim 15 wherein polling a storage system for values related to caching of I/Os in global memory for subsequent destaging to disk further comprises polling the storage system for historical write performance metrics.

19. The system of claim 11 further comprising:
    tracking I/O latency for I/Os from the host to the storage system; and
    if the I/O latency tracked by the host is above a threshold:
       polling the storage system for information regarding storage system cache utilization per logical storage device; and
       polling the storage system for storage system utilization load.

20. The system of claim 19 further comprising:
    sending the I/Os to the storage system for processing; and
    continuing to track I/O latency for the I/Os sent to the storage system for processing.

21. A computer program product including a non-transitory computer readable storage having computer program code encoded thereon that, when executed on a processor of a computer, causes the computer to reduce I/O latency in a storage system, the computer program code comprising:
    computer program code for polling a storage system for values related to caching of I/Os in global memory for subsequent destaging to disk;
    computer program code for determining respective write delay values for I/Os to be sent from a host communicatively coupled with the storage system according to the values related to caching of I/Os; and
    computer program code for applying the write delay values to the I/Os at the host to delay sending of the I/Os by respective delay times from the host to the storage system.

* * * * *